United States Patent [19]

Link

[11] Patent Number: 5,709,047
[45] Date of Patent: Jan. 20, 1998

[54] WRAPPED LURE SKIRTS AND METHOD OF MANUFACTURE

[76] Inventor: Donald J. Link, 1053 Legion St., Shakopee, Minn. 55379

[21] Appl. No.: 602,040

[22] Filed: Feb. 15, 1996

[51] Int. Cl.⁶ .................................................. A01K 85/00
[52] U.S. Cl. ............................................ 43/42.31; 43/42.28
[58] Field of Search ............................... 43/42.31, 42.28, 43/42.37, 42.29, 42.36, 42.38, 42.09

[56] References Cited

U.S. PATENT DOCUMENTS

| | | | |
|---|---|---|---|
| 4,619,067 | 10/1986 | West | 43/42.28 |
| 4,831,770 | 5/1989 | Dworski | 43/42.28 |
| 4,839,983 | 6/1989 | Pippert | 43/42.06 |
| 5,001,856 | 3/1991 | Gentry | 43/42.31 |
| 5,018,297 | 5/1991 | Kennedy | 43/42.31 |
| 5,038,513 | 8/1991 | Hardin | 43/42.31 |
| 5,119,582 | 6/1992 | Dahl | 43/42.28 |
| 5,230,178 | 7/1993 | Dillard | 43/42.31 |
| 5,426,886 | 6/1995 | Stanley | 43/42.31 |
| 5,499,471 | 3/1996 | Foutch | 43/42.31 |
| 5,517,782 | 5/1996 | Link | 43/42.37 |

OTHER PUBLICATIONS

Bass Pro Shops, 1989, p. 146.

*Primary Examiner*—Kurt Rowan
*Attorney, Agent, or Firm*—D. L. Tschida

[57] ABSTRACT

A multi-filament lure dressing having an elastomer core piece which attaches to a fishing lure and supports one or more rattle chambers. A longitudinal bore extends through the core and bored appendages and/or additional filaments radially project from the core. Plastic rattles having flanged heads mount to the appendage bores. One or more multi-filamented silicone rubber skirts, which can include transverse projections, are wrapped and adhesively bonded to the core to obscure supported rattles. During construction, the primary bore of the core is fitted to a mandrel and a peripheral band of a skirt having spaced apertures, which is pre-coated with an adhesive, is wrapped about the core and supported to a pin retainer fitted to the mandrel. An elastomer band clamp contains the wrapped skirt through adhesive curing. Once set, the wrapped skirt is cut from the mandrel and trimmed to prepare the skirt for mounting to a lure.

18 Claims, 10 Drawing Sheets

WRAPPED LURE SKIRTS AND METHOD OF MANUFACTURE

BACKGROUND OF THE INVENTION

The present invention relates to skirted fishing lures and, in particular, to a silicone rubber skirt, which is adhesively bound to a tubular core piece, and which core facilitates skirt and lure manufacture. The core may include additional filaments or appendages, which appendages may support beaded rattles or other attractants, and the wrapped skirt may also include transverse projections.

Numerous skirt dressings have been developed over the years for a variety of fishing lures. The skirts are used to enhance and exaggerate lure movements of both fresh and salt water lures. The filaments are constructed of soft pliable materials which move in the water. The skirts are typically constructed of a variety of elastomers, plastics and laminated materials.

Depending upon the skirt material, forming techniques frequently vary. For example, large numbers of solid bodied tails and tubular skirts are molded from plastisol gels. This material is very soft and pliable and can be cast at room temperatures in suitable molds. Wide ranges of coloration are achieved through dyes and particulates that are added to the material prior to casting.

A particular limitation or disadvantage of plastisol is that the material is not particularly durable. Over time, the dyes particularly tend to run, fade and/or bleed from the skirts. The material is also sensitive to temperature and protracted exposure to ultraviolet radiation.

Skirts constructed from elastomer or rubber sheet materials are more durable. A variety of rubber skirts are known which are constructed of rolled sheeting having slit filaments. The wraps of the rolled skirt blanks are retained to one another with a fast setting contact cement. Limitations of these skirts are that the rubber does not provide aesthetically pleasing colorations (i.e. the colors are drab and cloudy), the material doesn't readily support suspended particulates, such as glitter, and the rubber exhibits an inherently narrow range of temperature tolerance with checking, tacking or reverting occurring at the extremes. The contact adhesives also deteriorate with protracted use in water.

A particularly preferred material is silicone rubber which is very durable, provides pleasing colors (i.e. the colors are clear and tend to shine) and which holds its color for longer periods of time than plastisol. The material is also resistant to a wide range of temperatures, chemicals and ultraviolet radiation.

One type of skirt previously constructed from silicone rubber is made by collecting and cutting bunches of the filaments from sheets which contain solid border regions and from which slit filaments extend, e.g. U.S. Pat. No. 5,251, 395. The bunches are wrapped with a rubber band and which band, in turn, is used to secure the skirt to a lure.

Another type of skirt assembled from the material is formed by coating a solid fringe border with a room temperature vulcanization (RTV) adhesive and hand rolling the border upon itself to form a tubular end piece and from which the filaments extend. The tubular end, in turn, is fitted to a lure. An example of one such skirt is shown at U.S. Pat. No. 5,018,297.

A particular difficulty in manufacturing the later skirts arises from the tedious necessity of having to hand roll the material. The RTV adhesive also requires a relatively long curing time and the squeezing of adhesive from the material can create difficulties which effect production yields. Consequently, the skirts are relatively costly to manufacture.

A further shortcoming of available plastisol and band retained skirts is the unavailability of a mechanism for readily supporting rattle chambers and other lure dressings or accessories at the skirt and/or lure.

The improved silicone rubber skirts of the present invention were developed to overcome the foregoing deficiencies of available skirt dressings and which skirts also provide a silicone rubber core piece. Stranded sections of silicone sheeting are wrapped and bonded to the core and which core also retains the finished skirt to a lure.

Appendages at the core separately support rattle chambers and various other accessory lure dressings. Filament strands may also extend from the core. The filaments of the core and wrapped skirt can also include appendages or be cut to provide wavy or curlicue edges. The core supported skirts are readily fabricated over a wrapping mandrel having pin retainers which mate to apertures at the wrapped skirt blank and restrain a rolled skirt as the adhesive cures. A separate winged elastomer band can also mount over the wrapped skirt to facilitate curing.

SUMMARY OF THE INVENTION

It is a primary object of the invention to provide a multi-filamented lure dressing formed about an elastic core piece.

It is a further object of the invention to provide a core having appendages which separately support and retain rattles and/or other lure dressings to the core and/or a lure.

It is a further object of the invention to provide a core having filamentary appendages, which may include transverse projections, and which appendages augment the filaments of a separately wrapped skirt.

It is a further object of the invention to provide skirts having filaments with radially extending appendages that enhance skirt movement.

It is a further object of the invention to provide a method of skirt construction that includes a wrapping mandrel having through pins that support a core and a wrapped, adhesive coated skirt blank.

It is a further object of the invention to provide a wrapping mandrel having a pin retainer which fits through apertures of a wrapped skirt to retain the skirt during adhesive curing.

Various of the foregoing objects, advantages and distinctions of the invention are obtained in a number of constructions of filamentary skirt dressings. In one preferred construction, a cylindrical, silicone rubber core piece includes a longitudinal bore and a plurality of radially directed, bored appendages. A border of a flat skirt containing trailing filaments is coated with an RTV adhesive and wrapped about the core. The bore of the core and a wrapped collar formed at the skirt expand to mount to a hook or other mounting appendage at a fishing lure. One or more rattle chambers can be mounted to the bored appendages, upon fitting the skirt to a lure.

In another construction, a core is provided at a wrapped skirt which does not include radial appendages. In still another skirt, the skirt filaments include appendages, which radially project from the filaments to enhance contact with the water and skirt movement, and/or wavey edges are cut into the filaments. In yet another skirt, the core includes radially directed filaments.

The improved skirts are constructed with the aid of a wrapping mandrel which supports a silicone rubber core at an end axle. A border of a skirt blank containing a number of spaced apertures is coated with an RTV adhesive and wrapped over the core. The skirt apertures are sequentially fitted to a pin which projects from the mandrel. Once wrapped, a clamp or winged elastic band is fitted over the wrapped skirt collar to retain the skirt during curing. Alternatively, a knife edged pin is supported to the mandrel. Once cured, the wrapped collar of the skirt is cut from the retainer pin and the wrapped collar is trimmed to length. The prepared skirt can then be mounted to a desired lure.

Still other objects, advantages and distinctions of the invention, as well as other constructions are more apparent at the following description with respect to the appended drawings. To the extent various modifications and improvements have been considered, they are described as appropriate. The scope of the invention should not be literally construed nor limited by the disclosed constructions. Rather, the invention should be interpreted to include all those equivalent constructions within the scope of the further amended claims.

DESCRIPTION OF THE PREFERRED EMBODIMENT

Figure 1:
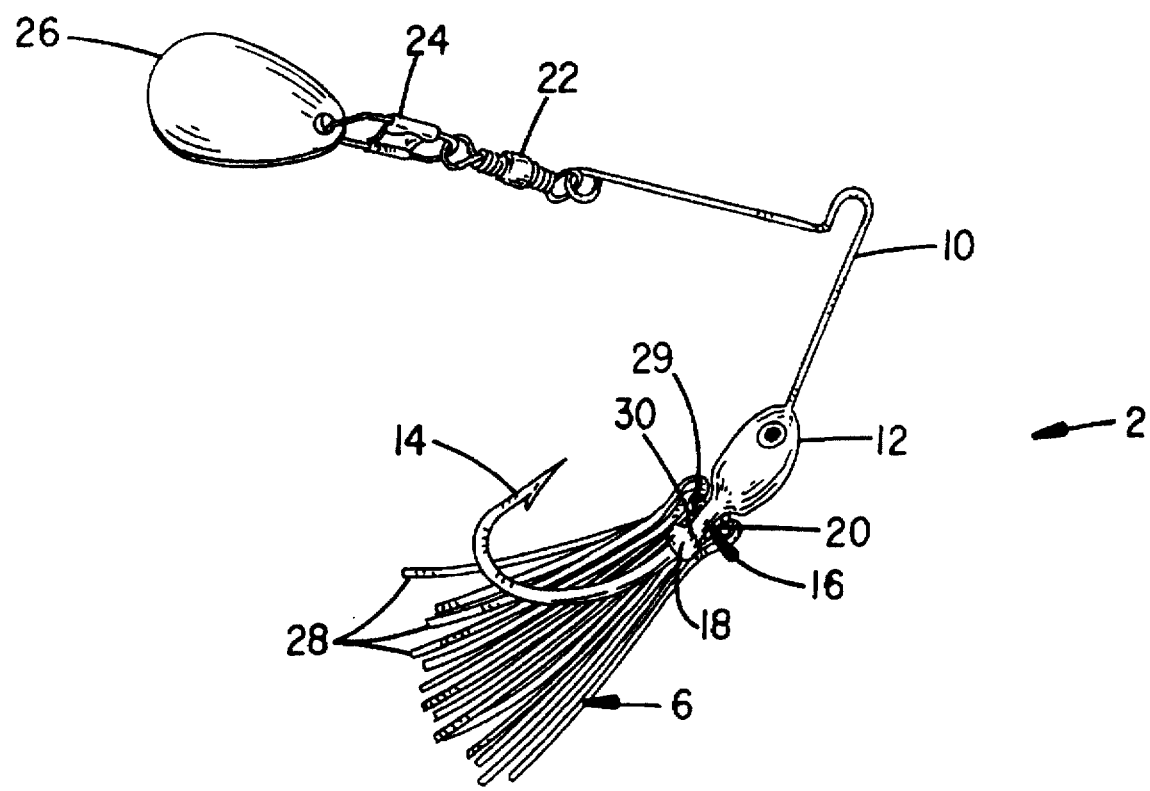
FIG. 1 depicts a spinnerbait containing an improved skirt of the invention.
Figure 2:
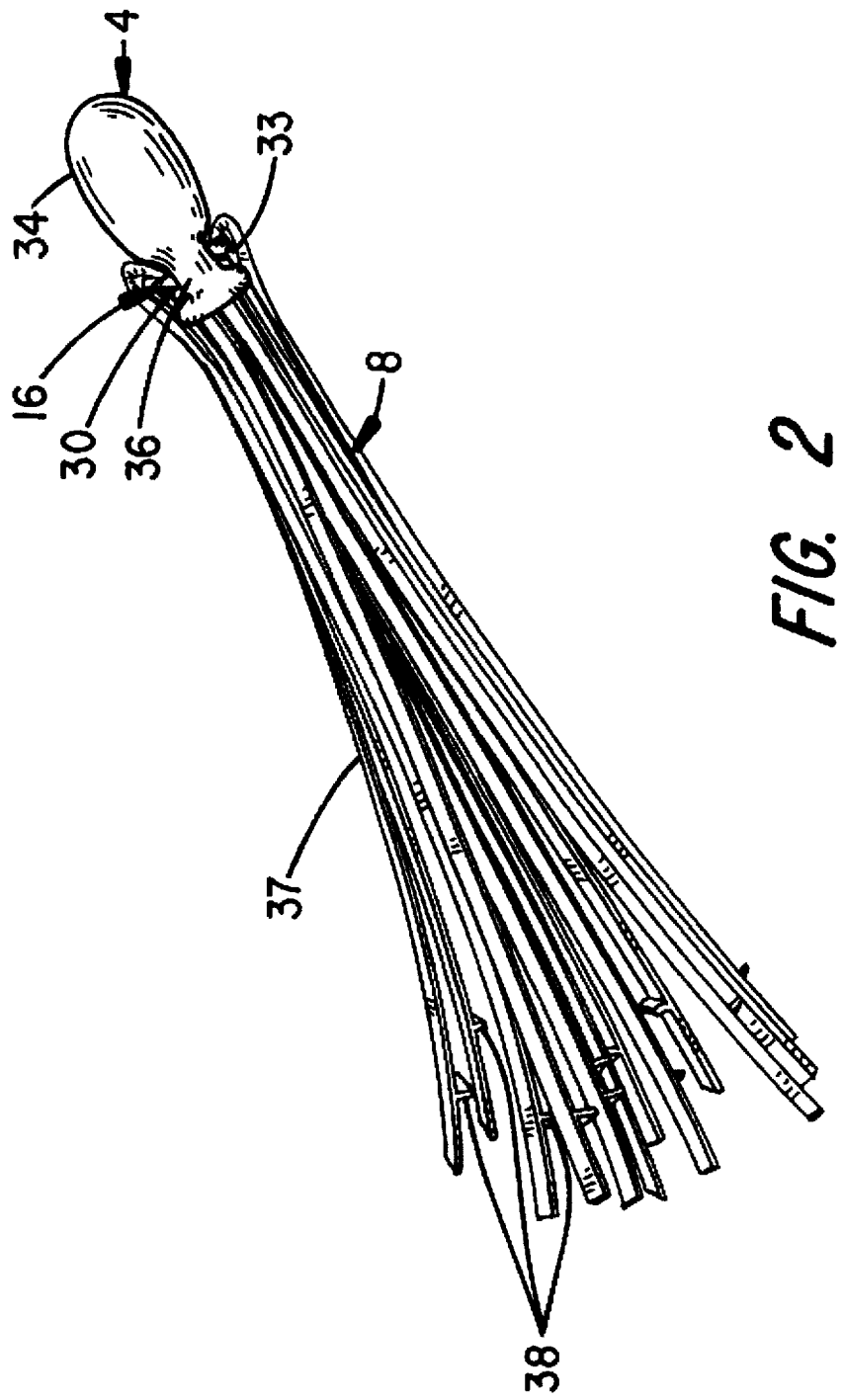
FIG. 2 shows a tapered or "bullet" line weight fitted with an improved skirt.

With attention to FIGS. 1 and 2, views are shown to a fishing lure 2 and a bullet weight fishing accessory 4 fitted with improved silicone rubber skirt dressings 6 and 8 of the invention. At FIG. 1, the skirt 6 is particularly fitted to a "spinnerbait" type of lure 2. A formed wire member 10 is cast to a weighted jig head 12 and from which a barbed hook 14 extends.

Figure 3:
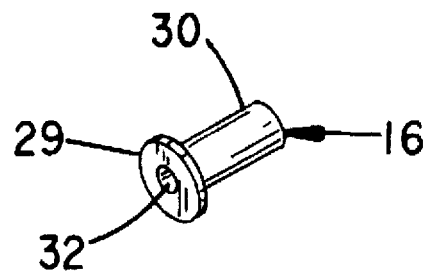
FIG. 3 shows a perspective drawing of a cylindrical core piece.

An elastic, silicone rubber core piece 16, shown in cutaway at the skirt 6 and in detail at FIG. 3, is fitted to an appendage 18 of the head 12 which extends along the shank of the hook 14. The core 16 and a surrounding wrapped collar 20 of the skirt 6 expand and compressively mount about the appendage 18. The core 16 is presently molded from a 70 durometer silicone rubber which provides sufficient rigidity, yet permits expansion as the skirt 6 is fitted to a lure. Slit filaments 28 depend from the band 20 to obscure the hook 14 and provide an undulating motion to the lure 2 as it moves through the water during retrieval. An opposite end of the wire form 10 supports a swivel 22, snap clip 24, and a concave spinner blade 26.

In distinction to known conventional plastisol and natural rubber skirts, a flange or head 29 at the core 16 radially displaces and arrays the filaments 28 in a controlled arrangement which hides the aft appendage 18 and hook 14. As important, the flange 29 also prevents the undesired flow of surplus adhesive onto the filaments as a border of the skirt 6 is wrapped to the core 16. A uniform array of the filaments 28 about the core 16 is thereby assured at each manufactured skirt.

The core 16 also does away with the need for a separate band retainer to support the skirt to the lure head 12, which further facilitates lure manufacture for assembly personnel, who individually add the skirts 6 to the lure 2. For skirts with a band retainer, it is necessary to thread the band over the appendage 18 and separately arrange the loose collection of filaments 24 about the lure head 12.

Extending from the flange 29 of the core 16 is a cylindrical body 30 and through which extends a longitudinal mounting bore 32. The bore 32 exhibits a uniform diameter at each skirt 6 and 8 versus the nonuniform bores which are formed at many hand rolled skirts, where the collar bore is formed upon merely wrapping the skirt material upon itself. The body 30 also provides a stable substrate over which the wraps are laid, which minimizes later separation of the collar wraps and degradation of the skirt life.

FIG. 2 shows a tapered or "bullet" line weight accessory 4 which finds application with various fishing lures and presentations. For example, the weight 4 can be adapted to slide along a fishing line independent of a hook which is separately secured to the fish line. A cast body 34 provides a tapered fore-end and from which a trailing appendage 36 extends to receive a core 16 of the skirt 8. As with the skirt 6, numerous filaments 37 trail from a wrapped, collar 33 which is adhesively bound to the core body 30.

Projecting from each of the filaments 37 are a number of appendages 38 which extend in a fashion to enhance movement of the filaments 37, as the filaments 37 pass through water. Although the appendages 38 are presently extruded with the skirt 8 to extend transverse to the filaments 37, the skirt 8 can be formed, by a variety of other methods to direct the appendages 38 at any desired angle. The appendages 38 may be formed to a variety of sizes and shapes, other than a rectangular shape shown, to enhance filament motion.

Multiple appendages 38 may also be bound to the filaments with an appropriate adhesive. Preferably, however, the appendages 38 are integrally cast with the filaments 37.

Figure 4:
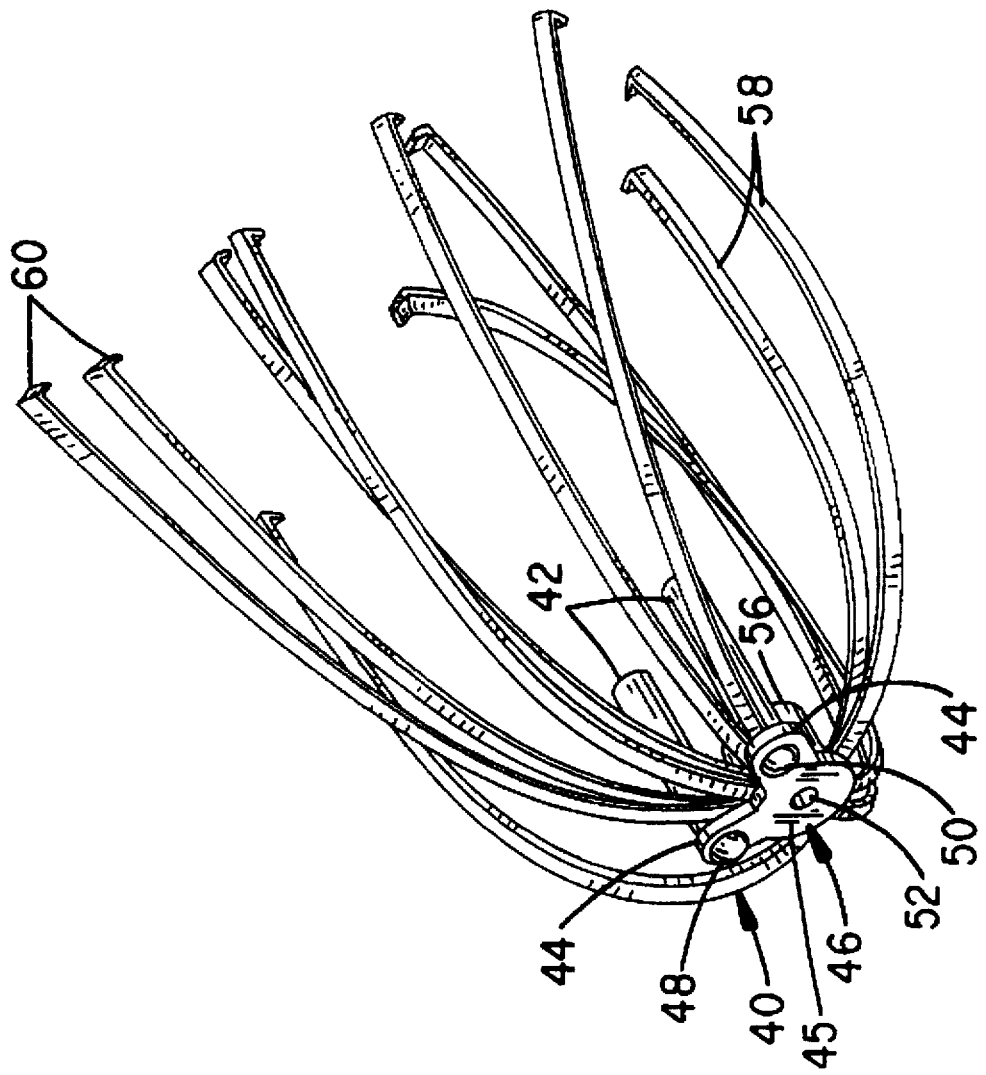
FIG. 4 is a perspective drawing of a prepared skirt having a core piece which supports a pair of rattle chambers at core appendages and a wrapped skirt having filaments which include transverse appendages at the filament ends.

FIG. 4 shows another multi-filament skirt 40 which supports a pair of tubular rattle chambers 42 at a pair of bored appendages 44 that project from a flanged end 45 of an elastomer core piece 46. Each rattle chamber 42 is supported at a bore 48 of each appendage 44 and which bores 48 mount into an annular groove 49 of each chamber 42 adjacent a chamber head 50, reference FIG. 5.

Figure 5:
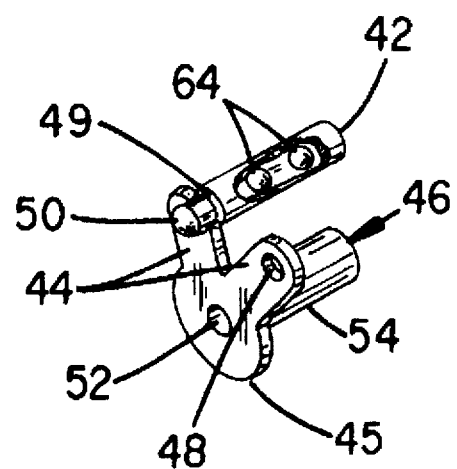
FIG. 5 is a perspective drawing of the core piece of FIG. 4 and which shows a rattle chamber in partial cutaway.

Also more apparent at FIG. 5 is the construction of the rattle chamber 42 which is retained to each appendage 44. Mounted within each rattle chamber 42 are one or more beads 64 which are contained to create audible sounds with movement. Although a preferred chamber 42 is shown, it is to be appreciated a variety of chambers 42 and other lure accessories might be fitted to the bores 48.

A longitudinal bore 52 extends through the body 54 of the core 46. The core 46 is formed of a flexible silicone rubber that is compatible to the skirt material and both of which expand as the wrapped collar 56 of the skirt 40 and core 46 are mounted to a desired lure appendage, fish hook or the like.

Like the skirt 8, multiple filaments 58 extend from the wrapped collar 56. The filaments 58 contain appendages 60 which transversely project from the end of each filament 58.

The skirts 6, 8, and 40 are preferably constructed of a silicone rubber which is appropriately colored and patterned. Desired colorations can be formed with dyes and/or surface colorings which are printed onto the skirts 6, 8 and 40. Colorized particulates may also be mixed into the silicone skirt material to be bound into the skirts 40 when molded.

Figure 6:
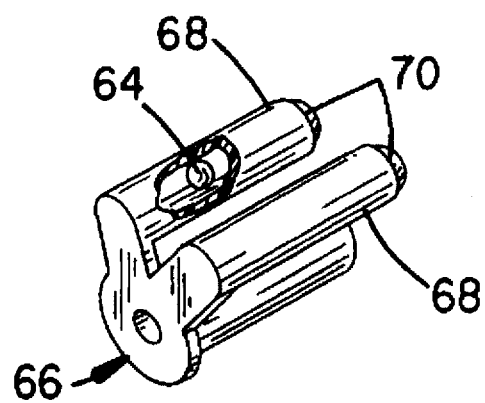
FIG. 6 is a perspective drawing of a core piece which supports a pair of integral rattle chambers.

FIG. 6 depicts an alternative core 66 having integral rattle chambers. In lieu of mounting detachable rattle chambers 42 to the appendages 44, the core 66 is cast with open ended tubular appendages 68. The appendages 68 separately contain a number of beads 64 and a hard end plug 70. Sound is produced as the beads 64 strike the plugs 70.

Figure 7:
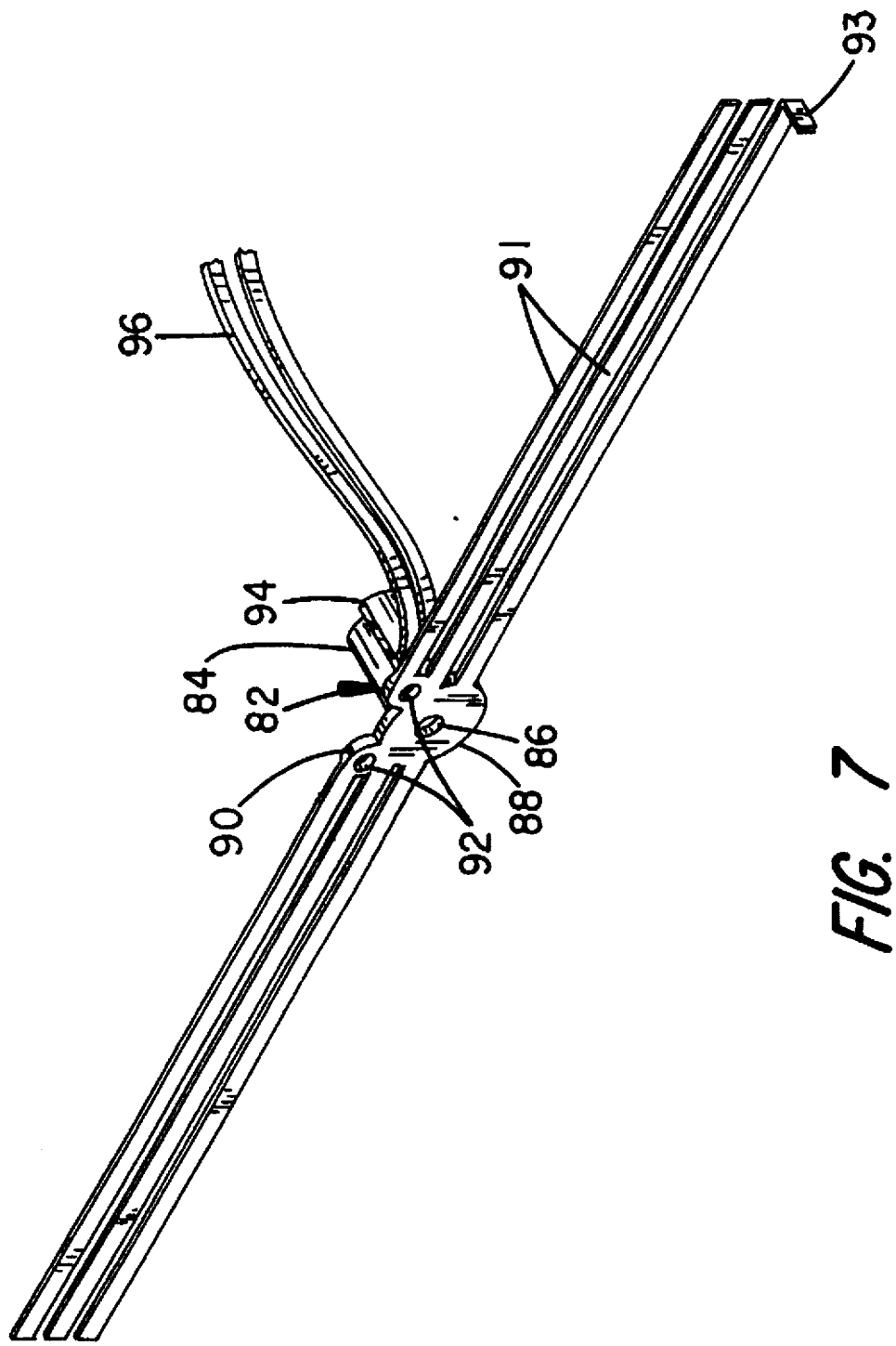
FIG. 7 is a perspective drawing of a core piece containing filaments that radially extend from a flanged head and from one of which filaments an exemplary transverse projection is depicted.

FIG. 7 shows yet another molded core piece 82 having a body 84, a longitudinal bore 86, and a flanged head 88. The head 88 includes a pair of appendages 90 having bores 92. The head 88 also includes a number of radially directed filaments 91. The filaments 92 may also contain appendages, such as the appendages 38 and 60 shown at FIGS. 2 and 4 which project from the body of the filaments 37 and 58, and an exemplary appendage 93 is shown to this effect.

Although the core 82 can be mounted to a lure alone, more typically a separate skirt 94, shown in partial section and having multiple filaments 96, is wrapped to the body 84. The filaments 91 and 96 tend to commingle to better obscure the hook and to enhance lure movement. Most typically, the coloration of the skirt 94 is selected to contrast to the filaments 91.

With attention to FIGS. 8 through 12, views are shown to the wrapping assembly and the method of construction used to wrap the skirts 6, 8, and 60 or any other skirts using a separately formed core piece, such as the core pieces 16, 40, 46, 66 or 82. The skirts are particularly formed with a wrapping assembly 98, reference FIG. 8, that contains a number of cylindrical mandrels or spindles 100 which radially extend from a hub 101. The hub 101 is supported to rotate at an upright support 103. Hub rotation is controlled with a spring biased detente assembly (not shown). The detente assembly is mounted between the hub 101 and support 103 such that the mandrels 100 can be incrementally advanced and retained relative to an operator work station. Although use of a mandrel 100 is preferred, skirts can be wrapped without a mandrel or even a core piece or even support holes, which are discussed below. The wrapping assembly 98 can also be used to wrap rubber skirts and assemble other lures.

Each mandrel 100 includes a cylindrical end piece or axle 102 of smaller diameter than the body 105 of the mandrel. The axle 102 is sized to mount within the bore 52 of a core piece 16 or 46. Once the core piece 16 or 46 is fitted to the mandrel 100, a skirt blank 104 is wrapped about the core 46.

Figure 9:
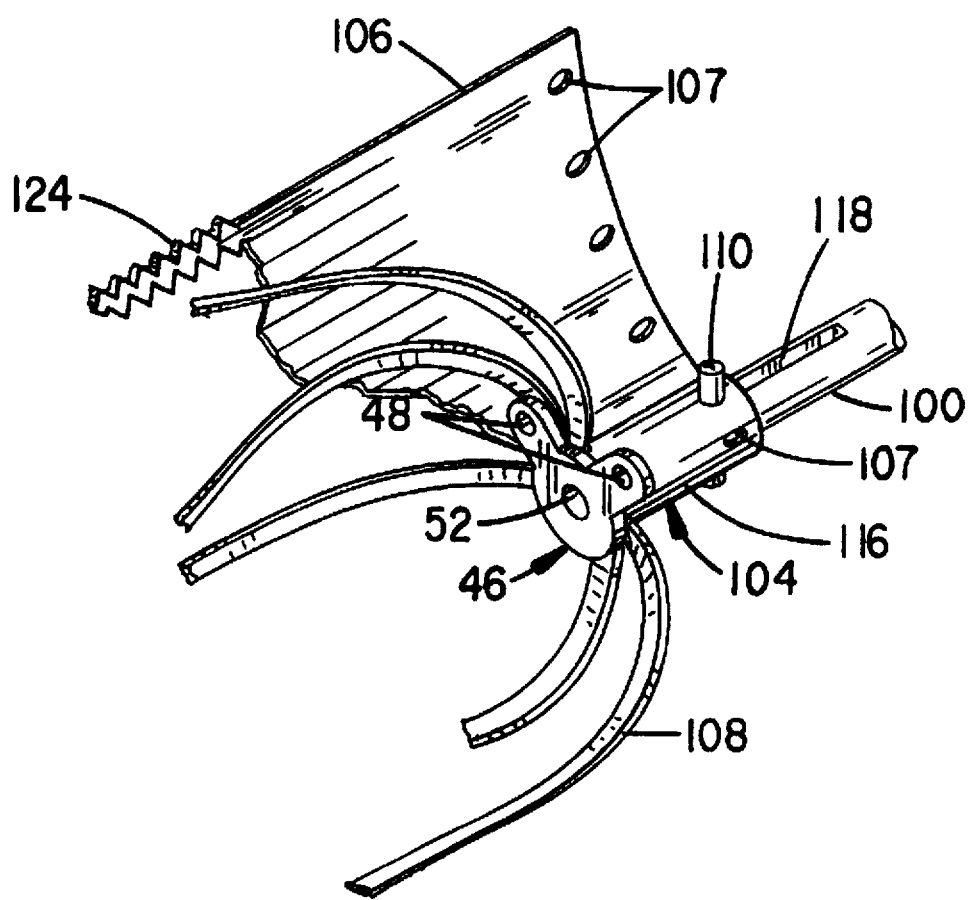
FIG. 9 is a partial perspective drawing of a skirt wrapping mandrel which supports a pair of skirts wrapped about a core piece having rattle appendages and which skirts are retained with a pin retainer fitted through the skirt and mandrel.
Figure 10:
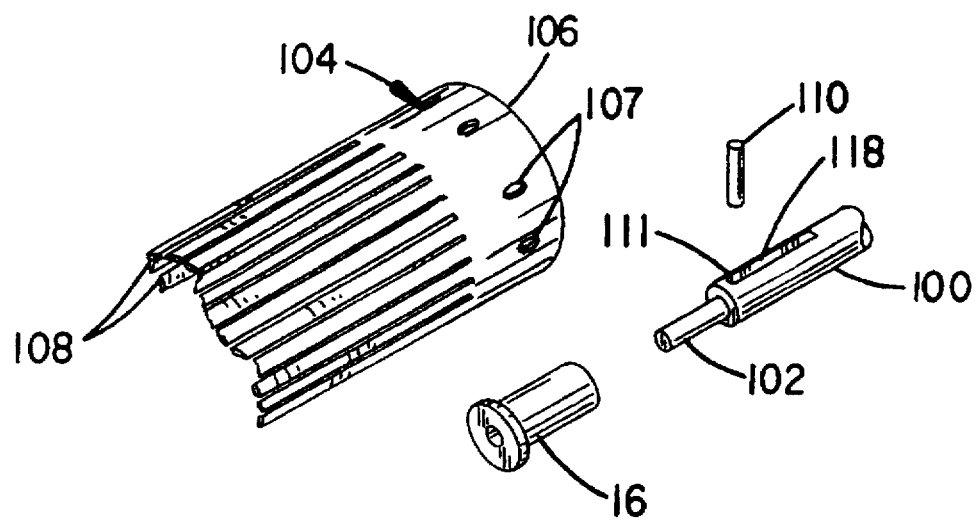
FIG. 10 is a perspective drawing shown in exploded assembly to a wrapping mandrel, core piece and pin retainer.

In particular and with additional attention to FIGS. 9 and 10, a border 106, which contains a number of seriatim apertures 107 and from which a number of filaments 108 extend, is coated on one surface with a suitable RTV adhesive compatible with the skirt 104 and collar 16 or 46. A first one of the apertures 107 is mounted over a pin 110 that extends through a hole 111 at the axle 102 to anchor the skirt 104. The border 106 is then wrapped around the axle 102 until the next aperture 107 is encountered and mounted over the opposite end of the pin 110. The process is continued until the skirt blank 104 is fully wrapped.

The apertures 107 are presently spaced to accommodate the distance required for each half wrap. It is to be appreciated the apertures 107 could be deleted since the thickness and density of the border 106 is such that the pins 110 can be pushed through the material. Wrapping speed, however, is enhanced with the presence of the apertures 107.

Although a single skirt 104 is shown as being wrapped to the core 46, it is to be appreciated multiple skirts 104 of differing colors can be sequentially wrapped over each other. Selected color combinations can thus be obtained.

Figure 8:
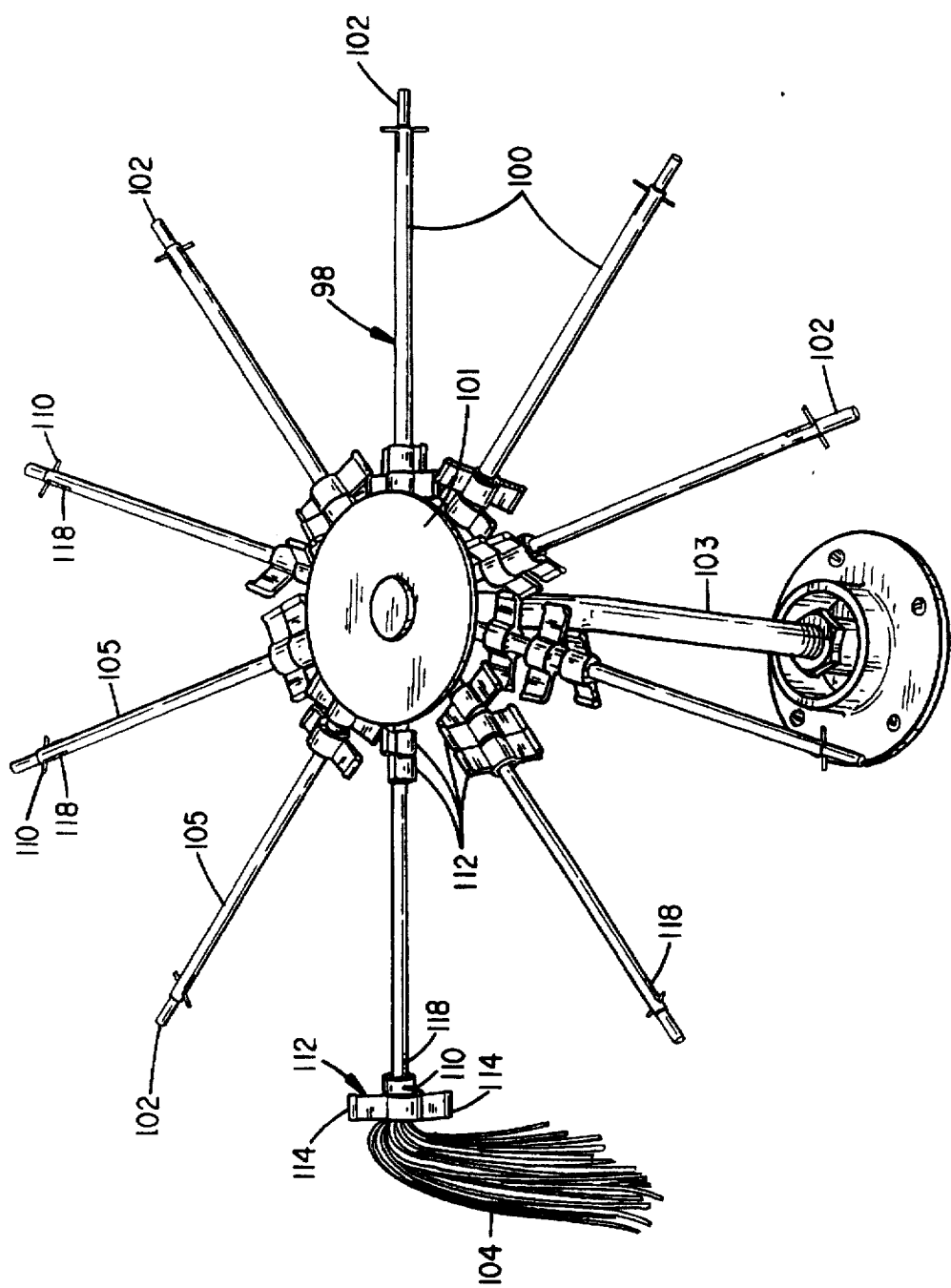
FIG. 8 is a perspective drawing of a skirt wrapping assembly that supports a number of wrapping mandrels, curing bands and a wrapped skirt.
Figure 11:
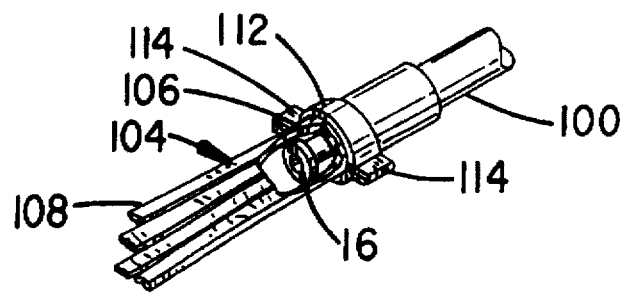
FIG. 11 is a partial perspective drawing of a skirt wrapping mandrel containing a partially wrapped skirt and pin retainer.

Once the skirt 104 is wrapped and with attention to FIGS. 8 and 11, a natural rubber band clamp 112 having a pair of wings 114 is mounted over the wrapped collar 116 to support the collar 116 as the adhesive cures. A natural rubber clamp is preferred since the RTV adhesive doesn't adhere to the clamp 112. A variety of plastic comprehension clamps may also be substituted for the band clamp 112. The numbers of mandrels 100 are also selected to permit adhesive curing before each mandrel 100 is rotated back to the work station. A continuous work flow is thus obtained.

With the curing of the adhesive, a knife (not shown) is inserted into a slit 118 in the mandrel 100 that is aligned to each pin 110. The collar 116 is cut from the pin 110 and the wrapped skirt 104 is removed from the axle 102. The slit portion of the collar 116 is then trimmed to remove the slit edge material and support holes 107 and provide a finished collar 116 of a preferred length. Once cut to size, the finished skirt is either packaged or fitted to a complementary lure.

Figure 12:
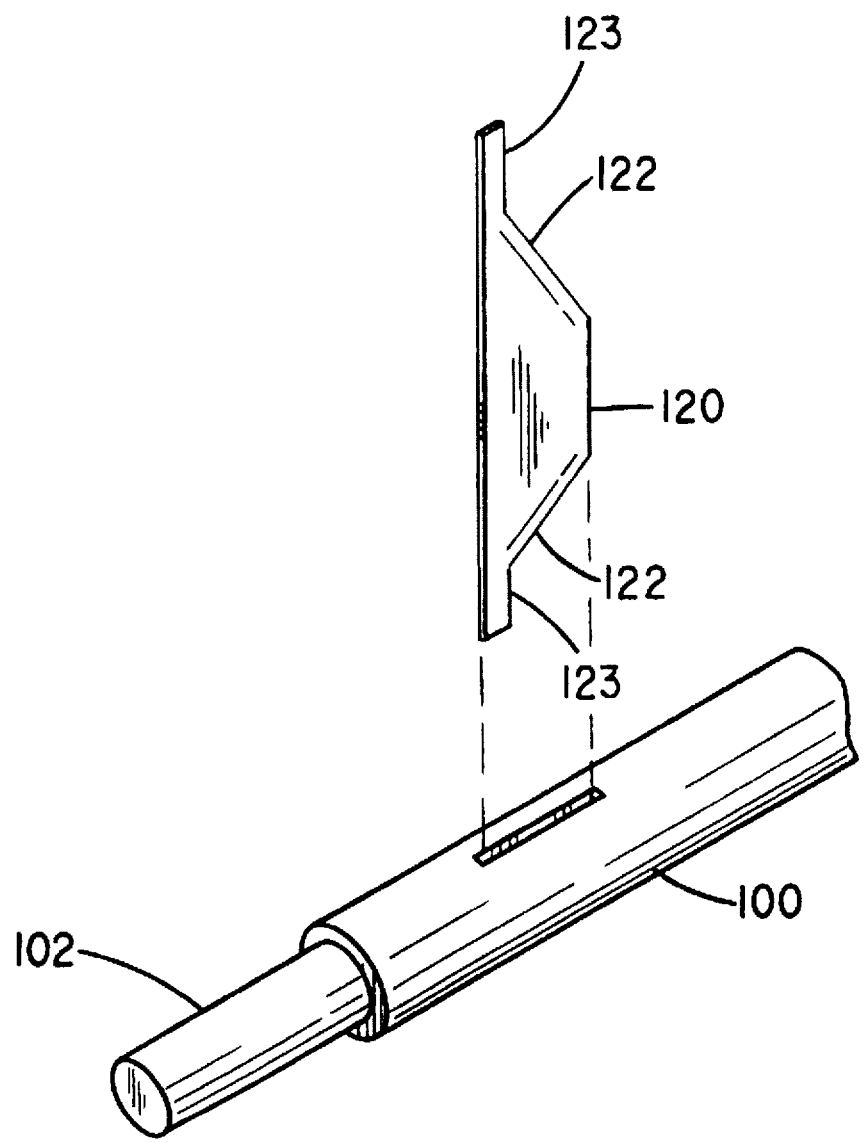
FIG. 12 is a partial perspective drawing of a skirt wrapping mandrel containing a wrapped skirt and curing band.

In lieu of using a skirt retainer pin 110, FIG. 12 shows a mandrel 100 which is fitted with a pin 120 having a pair of knife edges 122. Pin surfaces 123 project from the ends of the pin 120. The skirt blank 104 is wrapped as before over the pin 120, except that once the adhesive is cured the wrapped skirt 104 can merely be pulled from the mandrel 100, with the knife edges 122 cutting the collar 116 away from the mandrel 100.

Although the improved silicone skirts of the invention have been described with respect to a number of presently preferred core pieces, it is to be appreciated the core pieces can be configured to a variety of shapes and sizes, depending upon the desired mounting at the lure or hook. The flanged head and body of the core can also be constructed to any variety of sizes and shapes and appendages of a variety of shapes can be cast with the flanged head to receive the rattle retainers, define rattle chambers or support still other desired lure dressings. The construction of the filaments of each skirt may similarly varied as discussed above or may also be cut in the fashion of the exemplary filament 124 at FIG. 9 to provide a zigzag or curlicue edge to further enhance skirt movement.

The wrapping assembly might also be modified to provide motorized mandrels which rotate. Alternatively, a motorized collet might be provided which accepts separate collar support axles 102.

While the invention has been described with respect to a number of presently considered and preferred constructions, it is to be appreciated still other constructions may be suggested to those skilled in the art upon reference hereto. The invention should therefore be construed to include all those equivalent embodiments within the spirit and scope of the following appended claims.

What is claimed is:

1. A lure dressing comprising:
   a) rattle means;
   b) an elastomer core having a head and a body, wherein a first bore extends through said head and body, wherein said head radially projects from said body and includes a bore which is displaced form said body, and wherein said rattle means is attached to the displaced bore of said head; and
   c) an elastomer skirt having a border and a plurality of filaments which extend from said border and wherein said border is wrapped about said body, whereby said filaments and said rattle means are displaced from said body add undulate with movement of the dressing.

2. Apparatus as set forth in claim 1 wherein said head concentrically extends from an end of said body, wherein said head is substantially shorter than said body, and wherein the displaced bore of said head extends through an appendage which projects from said head.

3. Apparatus as set forth in claim 1 wherein a plurality of second filaments extend from said head.

4. Apparatus as set forth in claim 3 wherein each of said second filaments comprises a flat strip and an appendage protrudes from each strip.

5. Apparatus as set forth in claim 4 wherein said appendage protrudes from a distal end of each of said second filaments.

6. Apparatus as set forth in claim 1 wherein the filaments of said skirt comprise flat planar strips and wherein a plurality of said strips include an appendage which protrudes from the strip.

7. Apparatus as set forth in claim 6 wherein the appendages of the plurality of strips which contain appendages protrude from a distal end of the strip.

8. A lure dressing comprising:
   a) a rattle means;
   b) an elastomer core having a cylindrical head and a cylindrical body, wherein a first bore extends through said head and body, wherein said head is concentric to and projects from an end of said body, wherein a plurality of appendages extend from said head, and wherein said rattle means is attached to one of said plurality of appendages in displaced relation to said body; and
   c) an elastomer skirt having a border and a plurality of filaments which extend from said border and wherein said border is wrapped about said body, whereby said rattle means and said filaments are displaced from said body and undulate with movement of the dressing.

9. Apparatus as set forth in claim 4 wherein said rattle means comprises a hollow cavity at one of said plurality of appendages and wherein a bead is mounted to rattle within said cavity.

10. Apparatus as set forth in claim 8 wherein the filaments of said skirt comprise flat planar strips and wherein a plurality of said strips include an appendage which protrudes from the strip.

11. Apparatus as set forth in claim 10 wherein at least one of said plurality of appendages includes a bore and wherein said rattle means is attached to the bore of said appendage.

12. Apparatus as set forth in claim 8 wherein a plurality of second filaments extend from said head.

13. Apparatus as set forth in claim 8 wherein said second filaments comprise flat planar strips and wherein a plurality of said second filaments include an appendage which protrudes from the strip.

14. A lure dressing comprising:
   a) a plurality of rattle means;
   b) a unitary elastomer core having a cylindrical head and a cylindrical body, wherein a first bore extends through said head and body, wherein said head concentrically extends from an end of said body, wherein a plurality of appendages radially project from said head, wherein each appendage includes a bore which bore is displaced from said body, and wherein each of said plurality of rattle means is attached to the bore of one of said plurality of appendages; and
   c) an elastomer skirt having a border and a plurality of filaments which extend from said border and wherein said border is wrapped about said body, whereby said plurality of rattle means and said filaments are displaced from said body and undulate with movement of the dressing.

15. Apparatus as set forth in claim 14 wherein a plurality of skirts are wrapped to overly one another at said body.

16. Apparatus as set forth in claim 14 wherein each of the filaments of said skirt comprises a flat planar strip and wherein a plurality of said strips include an appendage which protrudes from the strip.

17. Apparatus as set forth in claim 16 wherein a plurality of second filaments radially extend from said head.

18. Apparatus as set forth in claim 17 wherein said second filaments comprise flat planar strips and wherein a plurality of said second filaments include an appendage which protrudes from the strip.

* * * * *